United States Patent
Shiraishi et al.

(10) Patent No.: US 10,630,144 B2
(45) Date of Patent: Apr. 21, 2020

(54) ELECTRIC MOTOR SUPPORT MECHANISM, COMPRESSOR, AND TURBOCHARGER

(71) Applicant: MITSUBISHI HEAVY INDUSTRIES, LTD., Tokyo (JP)

(72) Inventors: Keiichi Shiraishi, Nagasaki (JP); Ichiro Hirakawa, Nagasaki (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 15/748,857

(22) PCT Filed: Nov. 1, 2016

(86) PCT No.: PCT/JP2016/082436
§ 371 (c)(1),
(2) Date: Jan. 30, 2018

(87) PCT Pub. No.: WO2017/094426
PCT Pub. Date: Jun. 8, 2017

(65) Prior Publication Data
US 2018/0262088 A1 Sep. 13, 2018

(30) Foreign Application Priority Data
Dec. 3, 2015 (JP) .................................. 2015-236725

(51) Int. Cl.
*H02K 7/18* (2006.01)
*H02K 5/00* (2006.01)
(Continued)

(52) U.S. Cl.
CPC .......... *H02K 7/1823* (2013.01); *F02B 39/10* (2013.01); *F02C 6/12* (2013.01); *H02K 5/00* (2013.01);
(Continued)

(58) Field of Classification Search
CPC .......... H02K 7/18; H02K 5/00; H02K 7/1823; H02K 7/14; H02K 5/24; H02K 2213/03; H02K 5/18; F02B 39/10; F02C 6/12
See application file for complete search history.

(56) References Cited

U.S. PATENT DOCUMENTS 6,342,741 B1 1/2002 Fukui et al.
2010/0143111 A1 6/2010 Kuehnel
(Continued)

FOREIGN PATENT DOCUMENTS

CN 101749283 A 6/2010
EP 2 110 531 A1 10/2009
(Continued)

OTHER PUBLICATIONS

Office Action dated Jan. 17, 2019, issued in counterpart KR application No. 10-2018-7002914, with English translation. (10 pages).
(Continued)

*Primary Examiner* — Naishadh N Desai
(74) *Attorney, Agent, or Firm* — Westerman, Hattori, Daniels & Adrian, LLP

(57) ABSTRACT

An electric motor support mechanism having a cylindrical member that is attached to the end part of the intake opening side of an air inlet guide, and is formed in a cylindrical shape around an axis line extending along a rotation shaft, a plurality of struts connected to multiple locations on the inner circumferential surface of the cylindrical member, the plurality of struts extending in the radial direction from the inner circumferential surface toward the axis line, and connecting members that connect pairs of struts disposed adjacently in the circumferential direction around the axis line. The end parts of the plurality of struts on the axis-line side in the radial direction are connected in multiple locations on the outer circumferential surface of the electric
(Continued)

motor, whereby the electric motor is supported on the axis line.

9 Claims, 4 Drawing Sheets

(51) Int. Cl.
    *F02B 39/10*    (2006.01)
    *F02C 6/12*     (2006.01)
    *H02K 7/14*     (2006.01)
    *H02K 5/24*     (2006.01)
    *H02K 5/18*     (2006.01)

(52) U.S. Cl.
    CPC ............... *H02K 7/14* (2013.01); *H02K 5/18* (2013.01); *H02K 5/24* (2013.01); *H02K 2213/03* (2013.01)

(56) References Cited

U.S. PATENT DOCUMENTS

| | | |
|---|---|---|
| 2010/0266430 A1 | 10/2010 | Shimizu |
| 2013/0154266 A1 | 6/2013 | Ono et al. |
| 2015/0135707 A1* | 5/2015 | Ono .................... F02B 37/10 |
| | | 60/605.1 |
| 2016/0369817 A1 | 12/2016 | Tsuji et al. |
| 2017/0167511 A1* | 6/2017 | Tsuji .................... F02B 37/10 |

FOREIGN PATENT DOCUMENTS

| | | |
|---|---|---|
| EP | 2 247 838 A2 | 11/2010 |
| JP | 2000-333411 A | 11/2000 |
| JP | 2005-269751 A | 9/2005 |
| JP | 4247217 B2 | 4/2009 |
| JP | 2010-151128 A | 7/2010 |
| JP | 2015-158161 A | 9/2015 |
| JP | 2015-169073 A | 9/2015 |
| KR | 10-2011-0047826 A | 5/2011 |
| WO | 2009/008225 A1 | 1/2009 |
| WO | WO-2009087273 A2 * | 7/2009 ............ F02B 33/34 |
| WO | 2012/056525 A | 5/2012 |
| WO | 2014/087009 A1 | 6/2014 |

OTHER PUBLICATIONS

International Search Report dated Jan. 24, 2017, issued in Counterpart International Application No. PCT/JP2016/082436 w/English Translation. (4 pages).

Extended (Supplementary) European Search Report dated Jul. 24, 2018, issued in counterpart apllication No. 16870366.8. (8 pages).

Office Action dated Apr. 18, 2019, issued in counterpart EP Application No. 16 870 366.8 (6 pages).

* cited by examiner

ELECTRIC MOTOR SUPPORT MECHANISM, COMPRESSOR, AND TURBOCHARGER

TECHNICAL FIELD

The present invention relates to an electric motor support mechanism for supporting an electric motor, a compressor, and a turbocharger.

BACKGROUND ART

In the related art, a turbocharger is known which compresses air and supplies the air as combustion air for an internal combustion engine into cylinders. For example, the turbocharger is widely used in 2-stroke low-speed engines such as marine diesel engines and power generation diesel engines. In this turbocharger, a compressor for compressing the combustion air and a turbine serving as a drive source of the compressor are connected to each other via a rotor shaft, and are accommodated inside a casing. In this manner, both of these are integrally rotated. For example, the turbine driven using exhaust gas discharged from the internal combustion engine as a drive source.

As one type of the turbocharger, a hybrid turbocharger known in which an electric motor is connected to the rotor shaft (for example, refer to PTL 1). Similarly to a normal turbocharger, the hybrid turbocharger compresses the air, and supplies the air as the combustion air into the cylinders of the internal combustion engine. In addition to this function, the hybrid turbocharger drives a rotor shaft by using excess exhaust gas discharged from the internal combustion engine so that the electric motor generates electric power.

In addition, as another type of the turbocharger, an electric assist turbocharger is known in which a motor is connected to a rotor shaft (for example, refer to PTL 2). In the electric assist turbocharger, the motor is miniaturized by omitting a power generation function of an electric motor generator used for the hybrid turbocharger and focusing on an electric motor function.

CITATION LIST

Patent Literature

[PTL 1] Japanese Patent No. 4247217
[PTL 2] Japanese Unexamined Patent Application Publication No. 2015-158161

SUMMARY OF INVENTION

Technical Problem

According to the turbocharger disclosed in PTL 1, the electric motor is accommodated in a shell housing disposed in a muffler (silencer) located on an upstream side of a compressor unit. Since the electric motor is accommodated in the shell housing, heat generated by the electric motor is likely to be accumulated inside the shell housing. Therefore, in order to sufficiently cool the electric motor, it is necessary to dispose a separate cooling mechanism such as d cooling water circulation mechanism.

In addition, according to the turbocharger disclosed in PTL 2, a housing of the motor is supported by an air inlet guide via four support members. However, the support members do not extend, toward the rotation center of a rotor of the motor, and the respective four support members independently support four positions of the housing of the motor. Therefore, a motor support structure using the support members disclosed in PTL 2 has room for improvement.

The present invention is made in view of these circumstances, and an object thereof is to provide an electric motor support mechanism which can reliably support an electric motor on an axis line extending along a rotary shaft of a compressor unit and which can sufficiently cool the electric motor without disposing any cooling mechanism, and to provide a compressor including the electric motor support mechanism, and a turbocharger.

Solution to Problem

In order to achieve the above-described object, the present invention adopts the following means.

According to an aspect of the present invention, there is provided an electric motor support mechanism of a compressor including a compressor unit for compressing a fluid flowing from an intake port, a casing unit for accommodating the compressor unit, and an electric motor having a drive shaft connected to a rotary shaft of the compressor unit. The electric motor support mechanism includes a cylindrical member that is attached to an end portion on the intake port side of the casing unit, and that is formed in a cylindrical shape around an axis line extending along the rotary shaft, a plurality of support members that are respectively connected to a plurality of locations on an inner peripheral surface of the cylindrical member, and that extend in a radial direction from the inner peripheral surface toward the axis line, and a connection member that connects a pair of the support members located adjacent to each other in a circumferential direction around the axis line. The plurality of support members respectively connect end portions on the axis line side in the radial direction to a plurality of locations on an outer peripheral surface of the electric motor so that the electric motor is supported on the axis line.

According to the electric motor support mechanism in the aspect of the present invention, the cylindrical member is attached to the end portion on the intake port side of the casing unit for accommodating the compressor unit. The cylindrical member is formed in the cylindrical shape around the axis line extending along the rotary shaft of the compressor unit. Accordingly, the inner peripheral surface of the cylindrical member is located at a position apart as far as an equal distance from the axis line. In addition, the plurality of support members extending in the radial direction are connected to the plurality of locations on the inner peripheral surface of the cylindrical member, and the end portions of the plurality of support meters on the axis line side are respectively connected tote plurality of locations on the outer peripheral surface of the electric motor. Therefore, the electric motor is reliably supported on the axis line by the plurality of support members projecting in the radial direction orthogonal to the outer peripheral surface.

In addition, the cylindrical member is attached to the end portion on the intake port side of the casing unit, and the electric motor is supported by the plurality of support members so that a fluid can be circulated in a space around the electric motor. The fluid flowing into the intake port of the compressor unit flows along the outer peripheral surface of the electric motor on an upstream side of the intake port. Accordingly, the outer peripheral surface of the electric motor is cooled by the circulating fluid.

In addition, the pair of support members located adjacent to each other in the circumferential direction around the axis line is connected by the connection member. Accordingly, the electric motor is more reliably supported by the pair of support members located adjacent to each other.

In this way, according to the electric motor support mechanism in the aspect of the present invention, it is possible to provide the electric motor support mechanism which can reliably support the electric motor on the axis line extending along the rotary shaft of the compressor unit and which can sufficiently cool the electric motor without disposing any cooling mechanism.

In the electric motor support mechanism according to the aspect of the present invention, a configuration may be adopted as follows. The connection member is formed in a plate shape extending in the circumferential direction, one end in the circumferential direction of the connection member is connected to one of the pair of support members, and the other end in the circumferential direction of the connection member is connected to the other one of the pair of support members.

According to the electric motor support mechanism having this configuration, the pair of support members located adjacent to each other in the circumferential direction around the axis line is supported by the connection member formed in the plate shape extending in the circumferential direction. Therefore, the electric motor can be reliably supported along the circumferential direction by the pair of support members located adjacent to each other.

In the electric motor support mechanism according to the aspect of the present invention, the connection member may not, be located a first area where an interval between the pair of support members adjacent to each other in the circumferential direction is longest, and the connection member may be located in the other area where the interval of the pair of support members adjacent to each other in the circumferential direction is shorter than the interval of the first area.

In this way, a worker easily stretches his or her hand from the upstream side of the intake port toward the intake port via the first area where the interval between the pair of support members adjacent to each other in the circumferential direction is longest. Therefore, the worker can easily carry out work for connecting a connection portion between the drive shaft of the electric motor located closer to the intake port side than the electric motor support mechanism and the rotary shaft of the compressor unit.

In the electric motor support mechanism according to the aspect of the present invention, the pair of support members forming the first area nay be located apart from each other with an angular interval (θ1) from 120 to 180° around the axis line.

In this way, the pair of support members forming the first area is brought into a state where both of these are located apart from each other with the sufficient angular interval in the circumferential direction, thereby enabling the worker to more easily carry out the work for the connection portion.

In the electric motor support mechanism according to the aspect of the present invention, the connection member may be formed in a plate shape extending along the circumferential direction. The connection member may be located at a position closer to the outer peripheral surface of the electric motor than the inner peripheral surface of the cylindrical member in the radial direction.

In this way, the connection member extending along the circumferential direction projects in the direction orthogonal to the surface of the pair of support members adjacent to each other. Accordingly, the pair of support members can be more reliably supported by the connection member. In addition, the connection member supports the pair of support members at the position close to the outer peripheral surface of the electric motor. Therefore, it is possible to more reliably support the electric motor.

The electric motor support mechanism according to the aspect of the present invention may further include a silencer that is located on the intake port side of the compressor, that guides the fluid suctioned from outside to the intake port side, and that lowers a level of noise generated in the compressor. The cylindrical member may have a first flange portion attached to an end portion on the intake port side of the casing unit, and a second flange portion attached to an end portion on the intake port side of the silencer.

In this way, both the end portions in the direction of the axis line of the cylindrical member are respectively supported by the casing unit and the silencer. Therefore, it is possible to reliably fix the position of the cylindrical member in the direction of the axis line.

In the electric motor support mechanism according to the aspect of the present invention, the plurality of support members may support the electric motor so that the electric motor is located at a position farther from the intake port along a direction of the axis line than the cylindrical member.

In this way, the electric motor is located at the position far away from the intake port into which the compressed fluid flows. Therefore, it is possible to prevent the flow of the fluid flowing into the intake port from being disadvantageously hindered by the electric motor.

According to another aspect of the present invention, there is provided a compressor including the compressor unit, the casing unit, the electric motor, and any one of the above-described electric motor support mechanisms.

According to the compressor in the aspect of the present invention, the electric motor can be reliably supported on the axis line extending along the rotary shaft of the compressor unit, and the electric motor can be sufficiently cooled without disposing any cooling mechanism.

According to another aspect of the present invention, there is provided a turbocharger including the above-described compressor and a turbine that rotates around the axis line, and that is connected to the rotary shaft of the compressor unit.

According to the turbocharger in the aspect of the present invention, the electric motor can be reliably supported on the axis line extending along the rotary shaft of the compressor unit, and the electric motor can be sufficiently cooled without disposing any cooling mechanism.

Advantageous Effects of Invention

According to the present invention, it is possible to provide an electric motor support mechanism which can reliably support an electric motor on an axis line extending along a rotary shaft of a compressor unit and which can sufficiently cool the electric motor without disposing any cooling mechanism, and to provide compressor including the electric motor support mechanism, and a turbocharger.

DESCRIPTION OF EMBODIMENTS

Hereinafter, a turbocharger according to an embodiment of the present invention will be described with reference to the drawings.

A turbocharger 100 according to the present embodiment, is a device which improves combustion efficiency of a marine diesel engine by increasing gas (for example, air) to be supplied to the marine diesel engine (internal combustion engine used for a ship so as to have predetermined pressure (for example, atmospheric pressure) or higher.

Figure 1:
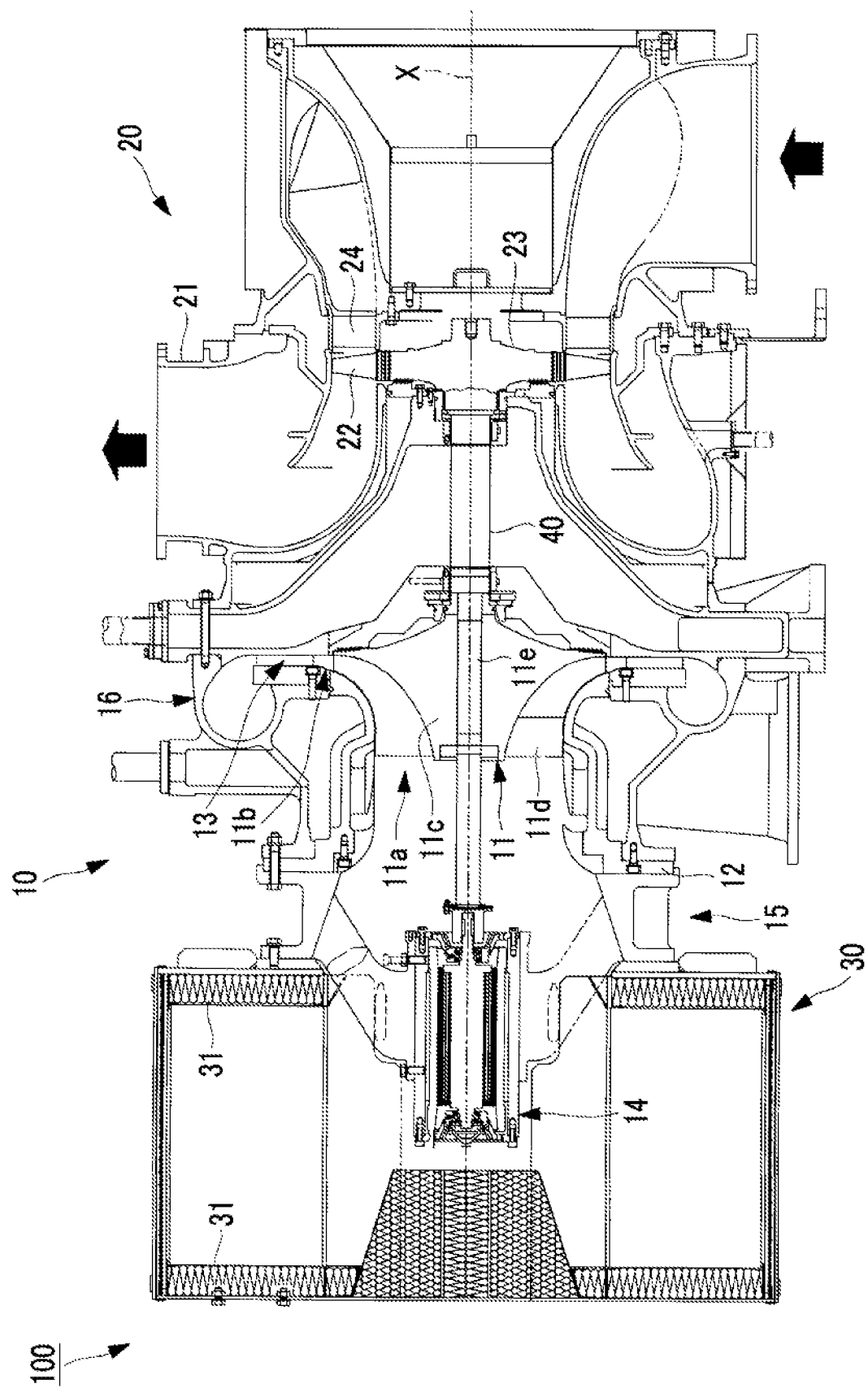
FIG. 1 is a longitudinal sectional view illustrating a turbocharger according to an embodiment of the present invention.

As illustrated in FIG. 1, the turbocharger 100 according to the present embodiment includes a centrifugal compressor 10, turbine 20, and a silencer 30. The centrifugal compressor 10 and the turbine 20 are connected to each other via a rotor shaft 40.

The centrifugal compressor 10 is a device which compresses gas flowing from the outside of the turbocharger 100 and supplies compressed gas (hereinafter, referred to as compressed gas) into a scavenging trunk (not illustrated) communicating with the inside of cylinder liner (not illustrated) configuring the marine diesel engine.

The turbine 20 includes a turbine housing 21, a turbine blade 22, a turbine disc 23, and a turbine nozzle 24. The turbine housing 21 is a hollow cylindrical member located around an axis line X, and internally accommodates the turbine blade 22, the turbine disc 23, and the turbine nozzle 24. In the turbine housing 21, exhaust gas discharged from the marine diesel engine flows downward in a direction indicated by an arrow in FIG. 1.

The exhaust gas guided to the turbine housing 21 passes through the turbine nozzle 24, and is guided to the turbine blade 29. The turbine blade 22 is attached at a regular interval around the axis line to an outer peripheral surface of the disk shaped turbine disc 23 fixed to the rotor shaft 40. Rotational force acting around the axis line X is applied to the turbine disc 23 in such a way that the exhaust gas expanded by static pressure passes through the turbine blade 22. The rotational force serves as power for rotating the rotor shaft 40, and causes an impeller 11 connected to the rotor shaft 40 to rotate around the axis line X. The exhaust gas passing through the turbine blade 22 is discharged upward along a direction indicated by an arrow in FIG. 1.

The silencer 30 is a device which is located on an intake port 11a side of the centrifugal compressor 10 and guides the gas suctioned from outside to the intake port 11a so as to lower a level of noise generated inside the centrifugal compressor 10. As illustrated in FIG. 1, the silencer 30 forms a flow path for guiding the gas flowing in a direction orthogonal to the axis line X to the centrifugal compressor 10. A sound-absorbing material 31 is located around the flow path. The sound-absorbing material 31 absorbs some of the noise generated inside the centrifugal compressor 10, thereby lowering the level of noise.

Next, the centrifugal compressor 10 according to the present embodiment will be described in more detail.

Figure 2:
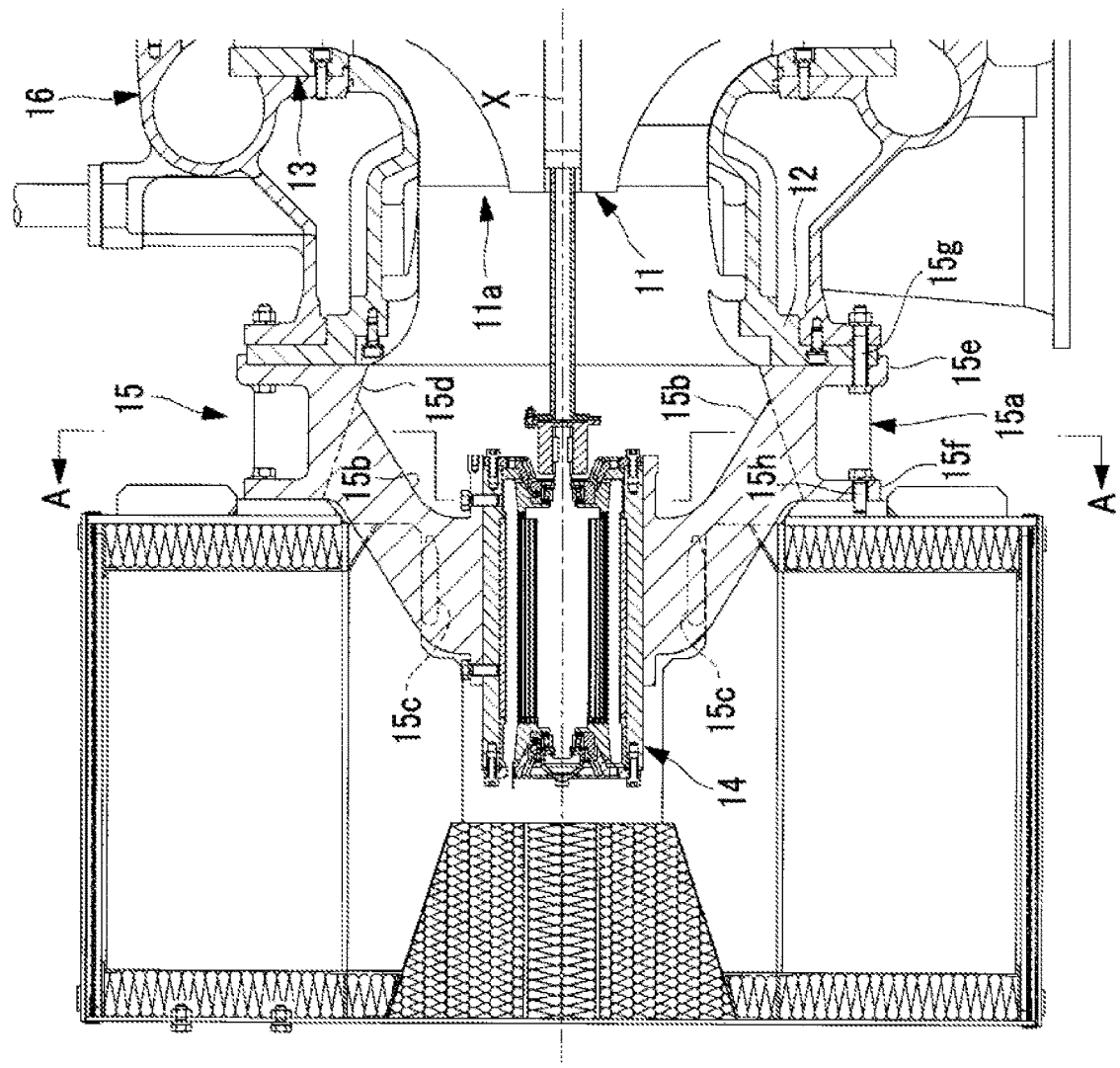
FIG. 2 is an enlarged view illustrating a main part of the turbocharger illustrated in FIG. 1.

As illustrated in FIGS. 1 and 2, the centrifugal compressor 10 includes an impeller (compressor unit) 11, an air inlet guide (casing unit) 12, a diffuser part 13, an electric motor (electric motor) 14, an electric motor support mechanism 15, and a scroll part 16.

As illustrated in FIG. 1, the impeller 11 is attached to the rotor shaft 40 extending along the axis line X, and rotates around the axis line X in response to the rotation of the rotor shaft 40 rotating around the axis line X. The impeller 11 rotates around the axis line X, thereby compressing the gas flowing from the intake port 11a and discharging the gas through a discharge port 11b.

The impeller 11 includes a hub 11c, a blade 11d attached to an outer peripheral surface of the hub 11c, and a rotary shaft 11e located at the center of the hub 11c and attached to the rotor shaft 40. The impeller 11 has a space formed between the outer peripheral surface of the hub 11c and an inner peripheral surface of the air inlet guide 12. The space is divided into a plurality of spaces by a plurality of the blades 11d. The impeller 11 applies centrifugal force acting in a radial direction to the gas flowing from the intake port 11a along the direction of the axis line X, and discharges the gas in the direction orthogonal to the direction of the axis line X (radial direction of the impeller 11). In this manner, the impeller 11 causes the compressed gas discharged to the discharge port 11b to flow into the diffuser part 13.

The air inlet guide 12 accommodates the impeller 11, and extends along the direction of the axis line X of the rotor shaft 40. Together with the impeller 11, the air inlet guide 12 forms a flow path through which the gas flowing from the intake port 11a along the axis line X is guided to flow in the radial direction orthogonal to the axis line X so as to reach the discharge port 11b.

The diffuser part 13 is a member which guides the compressed gas discharged from the discharge port 11b to the scroll part 16. The diffuser part 13 reduces flow velocity of the compressed gas discharged from the discharge port 11b of the impeller 11, thereby converting kinetic energy (dynamic pressure) applied to the compressed gas into pressure energy (static pressure). The compressed gas whose flow velocity is reduced when passing through the diffuser part 13 flows into the scroll part 16 communicated with the diffuser part 13. The compressed gas flowing into the scroll part 16 is discharged to a discharge pipe (not illustrated).

The scroll part 16 is a device into which the compressed gas discharged from the discharge port 11b flows, and which converts the kinetic energy (dynamic pressure) applied to the compressed gas into the pressure energy (static pressure). The scroll part 16 is located closer to an outer peripheral side in the radial direction orthogonal to the direction of the axis line X than the air inlet guide 12.

Next, the electric motor 14 will be described.

In the electric motor 14 according to the present embodiment, in a case where the marine diesel engine (main engine) is operated at a low load and the exhaust gas discharged from the marine diesel engine cannot provide the turbocharger with sufficient turbocharging capacity, the electric motor 14 is used in order to support (assist) the turbocharging capacity in such a way that the rotary shaft 11e of the centrifugal compressor 10 is rotated using electric power.

In addition, in a case where the exhaust gas is excessively discharged from the marine diesel engine (main engine), the electric motor 14 according to the present embodiment is a device which rotates a rotor via the rotor shaft 40 connected to the turbine 20 rotated by the exhaust gas. In this manner, the electric motor 14 can generate power, and can recover energy of the exhaust gas as the electric power.

In the above-described configuration, the electric motor 14 according to the present embodiment is provided with both an assist function to support the turbocharging capacity and a power generation function to generate the power using the energy of the exhaust gas. However, other embodiments may be adopted. For example, an embodiment ma be adopted so that the electric motor 14 is provided with only the assist function without being provided with the power generation function.

Figure 3:
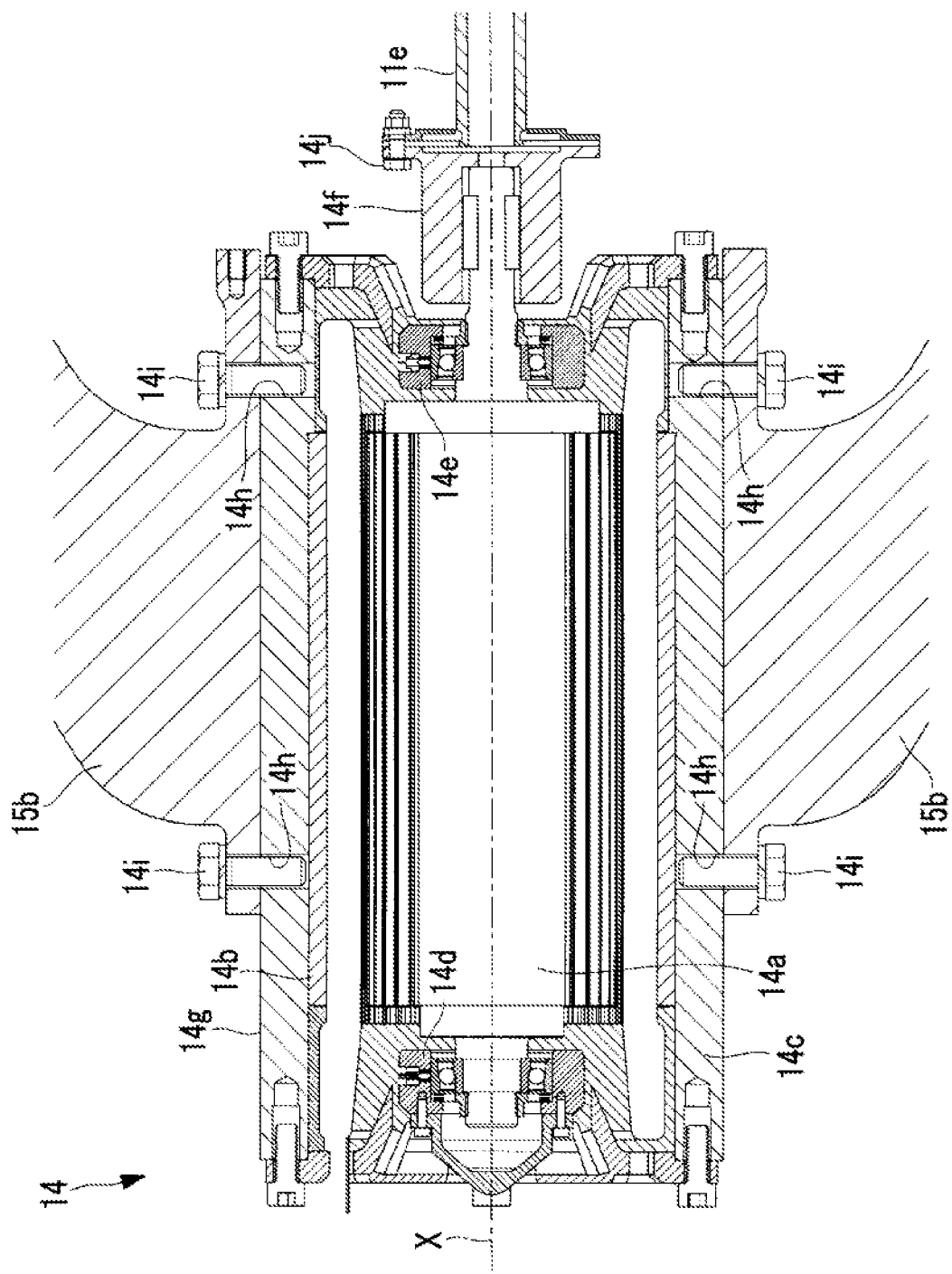
FIG. 3 is a longitudinal sectional view of an electric motor illustrated in FIG. 2.

As illustrated in a longitudinal sectional view of FIG. 3, the electric motor 14 includes a rotor 14*a*, a stator 14*b*, a housing 14*c* for accommodating the rotor 14*a* and the stator 14*b*, a pair of bearing portions 14*d* and 14*e* for holding a front end and a rear end of the rotor 14*a* inside the housing 14*c*, and a drive shaft 14*f* connected to the rotor 14*a*.

The longitudinal sectional view in FIG. 3 is a sectional view taken along arrow line B-B of the turbocharger illustrated in FIG. 4 (to be described later).

The rotor 14*a* is a member formed in a columnar shape, which extends along the axis line X and includes a permanent magnet on the outer peripheral surface. Both ends along the axis line X of the rotor 14*a* are respectively supported with respect to the housing 14*c* by the pair of bearing portions 14*d* and 14*e*.

The stator 14*b* is accommodated inside the cylindrical housing 14*c*. In a hollow portion of the stator 14*b*, the rotor 14*a* located on the axis line X is located in a state where the rotor 14*a* is not in contact with the stator 14*b*.

The housing 14*c* is a cylindrical member which extends along the axis line X. The stator 14*h* is fixed to an inner peripheral surface of the housing 14*c*. Fastening holes 14*h* are respectively formed at a plurality of locations on an outer per surface 14*g* of the housing 14*c*. The housing 14*c* is brought into a state of being supported by the electric motor support mechanism 15 in such a way that fastening bolts 14*i* are respectively fastened to the fastening holes 14*h* after being inserted into through-holes formed in a strut 15*b* of the electric motor support mechanism 15.

The drive shaft 14*f* is a member attached to an end portion on the intake port 11*a* side of the rotor 14*a*. The drive shaft 14*f* is connected to the rotary shaft 11*e* of the impeller 11 by the fastening bolt 14*j*.

In a case where the electric motor 14 is used in order to support (assist) the turbocharging capacity when the marine diesel engine (main engine) is operated at a low load, a control device (not illustrated) supplies the power to the stator 14*h* so as to accelerate the rotor 14*a* around the axis line X. In this manner, the rotation of the rotor 14*a* is transmitted to the rotary shaft 11*e* of the impeller 11 via the drive shaft 14*f*, thereby allowing the centrifugal compressor 10 to have the increased turbocharging capacity.

Next, the electric motor support mechanism 15 for supporting the electric motor 14 will be described.

As illustrated in FIG. 2, the electric motor support mechanism 15 includes a cylindrical member 15*a* formed in a cylindrical shape around the axis line X extending along the rotary shaft 11*e* of the impeller 11, and a plurality of the struts 15*b* respectively connected to a plurality of locations on an inner peripheral surface 15*d* of the cylindrical member 15*a*.

Figure 4:
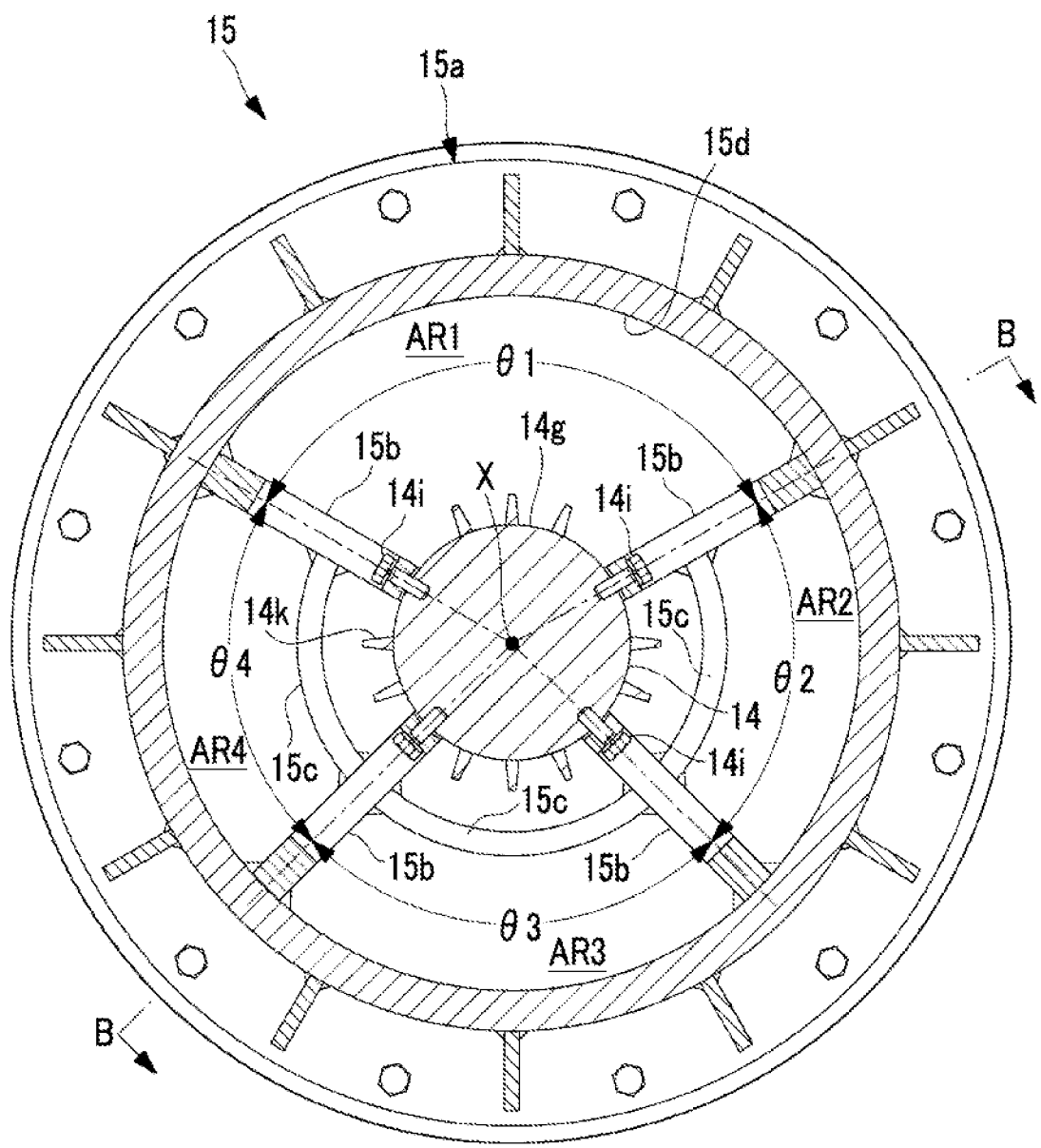
FIG. 4 is a sectional view taken along arrow line A-A of the turbocharger illustrated in FIG. 2.

In addition, as illustrated in FIG. 4, the electric motor support mechanism 15 includes a connection member 15*c* for connecting a pair of the struts 15*b* adjacent to each other along the circumferential direction around the axis line X.

As illustrated in FIG. 2, the cylindrical member 15*a* has a first flange portion 15*e* attached to the end portion on the intake port 11*a* side of the air inlet guide 12, and a second flange portion 15*f* attached to the end portion on the intake port 11*a* side of the silencer 30.

The first flange portion 15*e* and the air inlet guide 12 are fastened to each other by fastening bolts 15*q* at a plurality of locations around the axis line X. In addition, the second flange portion 15*f* and the silencer 30 are fastened to each other by fastening bolts 15*h* at a plurality of locations around the axis line X.

As illustrated in FIG. 4 (sectional view taken along arrow line A-A of the turbocharger illustrated in FIG. 2), the strut 15*b* is connected to the inner peripheral surface 15*d* so as to extend from the inner peripheral surface 15*d* of the cylindrical member 15*a* in the radial direction toward the axis line X.

The strut 15*b* illustrated in FIG. 4 is attached to the inner peripheral surface 15*d* of the cylindrical member 15*a* by means of welding. However, the cylindrical member 15*a* and the strut 15*b* may be integrally molded by means of casting.

In FIG. 4, the illustration of an internal structure of the electric motor 14 is omitted.

As illustrated in FIG. 4, the plurality of struts 15*b* support the electric motor 14 on the axis line X in such a way that end portions on the axis line X side in the radial direction orthogonal to the circumferential direction around the axis line X are respectively fastened to a plurality of locations on the outer peripheral surface 1 of the electric motor 14 by using the fastening bolts 14*i*.

As illustrated in FIG. 2, the plurality of struts 15*b* support the electric motor 14 so that the electric motor 14 is located farther away from the intake port 11*a* along the direction of the axis line X than the cylindrical member 15*a*.

In a case where the electric motor 14 is attached to the electric motor support mechanism 15, a worker fastens the fastening bolts 14*i* to the outer peripheral surface 14*g* of the electric motor 14 so that the center of the drive shaft 14*f* of the electric motor 14 is located on the axis line X. The worker adjusts state where the fastening bolts 14*i* are fastened to the fastening holes 14*h*. If necessary, the worker inserts a spacer (not illustrated) to which the fastening bolts 14*i* penetrate so as to be interposed between the strut 15*b* and the outer peripheral surface 14*g* of the electric motor 14, thereby adjusting a position of the electric motor 14.

As illustrated in FIG. 4, a space on an inner peripheral side of the cylindrical member 15*a* is partitioned into four areas of areas AR1, AR2, AR3, and AR4 by the plurality of struts 15*b*.

In the areas AR2, AR3, and AR4 illustrated in FIG. 4, the pair of struts 15*b* adjacent to each other in the circumferential direction is connected by the connection member 15*c*.

As illustrated in FIG. 2, the connection member 15*c* is formed in a plate shape extending in the direction of the axis line X. In addition, as illustrated in FIG. 4, the connection member 15*c* is formed in a plate shape extending in the circumferential direction around the axis line X. One end of the connection member 15*c* in the circumferential direction is connected to one of the pair of struts 15*b*, and the other end in the circumferential direction is connected to the other one of the pair of struts 15*b*.

As illustrated in FIG. 4, the connection member 15*c* is not located in the area AR1 (first area) where an interval between the pair of struts 15*b* adjacent to each other in the circumferential direction is θ1 which is longest. On the other hand, the connection member 15*c* is located in other areas (the area AR2 where the interval in the circumferential direction is θ2, the area AR3 where the interval in the circumferential direction is θ3, and the area AR4 where the interval in the circumferential direction is θ4) where the interval in the circumferential direction is shorter than the interval in the circumferential direction between the pair of struts 15*h* in the area Ar1.

The reason is as follows. In view of workability achieved by a worker, the connection member 15c is not located in the area AR1 where the interval between the pair of the struts 15b adjacent to each other in the circumferential direction is θ1 which is longest.

That is, the worker easily stretches his or her hand from the upstream side of the intake port 11a toward the intake port 11a via the area AR1 where the interval between the pair of struts 15b adjacent to each other in the circumferential direction is longest. Therefore, the worker can easily carry out work for connecting a connection portion between the drive shaft 14f of the electric motor 14 located closer to the intake port 11a side than the electric motor support mechanism 15 and the rotary shaft 11e of the impeller 11.

For example, it is desirable that a value of θ1 in the area AR1 where the interval between the pair of struts 15b adjacent to each other in the circumferential direction is θ1 which is longest is set to an angular interval from 120 to 180°.

As illustrated in FIG. 4, the connection member 15c is formed in a plate shape extending along the circumferential direction. In addition, the connection member 15c is located at a position closer to the outer peripheral surface 14g of the electric motor 14 than the inner peripheral surface 15d of the cylindrical member 15a in the radial direction. The reason that the connection member 15c is brought closer to the outer peripheral surface 14g is as follows. A position of the connection member 15c is located away from the mainstream of the gas flow, and the length in the circumferential direction around the axis line X of the connection member 15c is shortened so as to reduce the resistance acting against the gas passing between the inner peripheral surface 15d and the outer peripheral surface 14g.

The connection member 15c is located close to the outer peripheral surface 14g of the electric motor 14, but is located apart as far as a constant distance from the outer peripheral surface 14g. The reason is to avoid contact with cooling fins 14k (refer to FIG. 4) formed on the outer peripheral surface 14g of the electric motor 14.

The cooling fins 14k are respectively formed at a plurality of locations on the outer peripheral surface 14g of the electric motor 14, and are formed so as to extend along the axis line X. The cooling fins 14k are formed on the outer peripheral surface 14g of the electric motor 14 so as to increase a contact area with the fluid. In this manner, cooling efficiency of the electric motor 14 can be improved by using the fluid.

Next, an operation and an advantageous effect of the electric motor support mechanism according to the present embodiment will be described.

According to the electric motor support mechanism 15 of the present embodiment, the cylindrical member 15a is attached to the end portion on the intake port 11a side of the air inlet guide 12 for accommodating the impeller 11. The cylindrical member 15a is formed in a cylindrical shape around the axis line X extending along the rotary shaft 11e of the impeller 11. Accordingly, the inner peripheral surface 15d of the cylindrical member 15a is located at a position apart as far as an equal distance from the axis line X.

In addition, the plurality of struts 15b extending in the radial direction are respectively connected to a plurality of locations on the inner peripheral surface 15d of the cylindrical member 15a. The end portions on the axis line X side of the plurality of struts 15b are respectively connected to a plurality of locations on the outer peripheral surface 14g of the electric motor 14. Therefore, the electric motor 14 is reliably supported on the axis line X by the plurality of struts 15b projecting in the radial direction orthogonal to the outer peripheral surface 14g.

In addition, the cylindrical member 15a is attached to the end portion on the intake port 11a side of the air inlet guide 12, and the electric motor 14 is supported by the plurality of struts 15b so that the gas can be circulated in the space around the electric motor 14. The gas flowing into the intake port 11a of the impeller 11 flows along the outer peripheral surface 14g of the electric motor 14 on the upstream side of the intake port 11a. Accordingly, the outer peripheral surface 14g of the electric motor 14 is cooled by the circulating gas.

In this way, according to the electric motor support mechanism 15 of the present embodiment, it is possible to provide the electric motor support mechanism 15 which can reliably support the electric motor on the axis line X extending along the rotary shaft 11e of the impeller 11 and which can sufficiently cool the electric motor 14 without disposing any cooling mechanism.

The electric motor support mechanism 15 according to the present embodiment includes the connection member 15c for connecting the pair of struts 15b located adjacent to each other in the circumferential direction around the axis line X. The connection member 15c is formed in a plate shape extending in the direction of the axis line X. One end of the connection member 15c in the circumferential direction is connected to one of the pair of struts 15b, and the other end in the circumferential direction is connected to the other one of the pair of struts 15b.

According to the electric motor support mechanism 15 configured in this way, the pair of struts 15b located adjacent to each other in the circumferential direction around the axis line X is supported along the circumferential direction by the connection member 15c. Therefore, the rigidity of the pair of struts 15b adjacent to each other is improved, thereby preventing vibrations or misalignment of the electric motor 14. Therefore, the electric motor 14 can be more reliably supported by the plurality of struts 15b.

In addition, in the electric motor support mechanism according to the present embodiment, the connection member 15c is not located in the area AR1 where the interval between the pair of struts 15h adjacent to each other in the circumferential direction is longest. The connection member 15c is located in other areas where the interval between the pair of struts 15b adjacent to each other in the circumferential direction is shorter than that in the area AR1.

In this way, a worker easily stretches his or her hand from the upstream side of the intake port 11a toward the intake port 11a via the area AR1 where the interval between the pair of struts 15b adjacent to each other in the circumferential direction is longest. Therefore, the worker can easily carry out work for connecting the connection portion between the drive shaft 14f of the electric motor 14 located closer to the intake port 11a side than the electric motor support mechanism 15 and the rotary shaft 11e of the impeller 11.

In addition, in the electric motor support mechanism 15 according to the present embodiment, it is desirable that the pair of struts 15b forming the area AR1 is located apart from each other with the angular interval θ1 from 120° to 180° around the axis line X.

In this way, the pair of struts forming the area AR1 is brought into a state where both of these are located apart from each other with the sufficient angular interval in the circumferential direction, thereby enabling the worker to more easily carry out the work for the connection portion.

In addition, in the electric motor support mechanism according to the present embodiment, the connection member 15c is formed in the plate shape extending along the circumferential direction. The connection member 15c is located at the position closer to the outer peripheral surface 14g of the electric motor 14 than the inner peripheral surface 15d of the cylindrical member 15a in the radial direction.

In this way, the connection member 15c extending along the circumferential direction projects in the direction orthogonal to the surface of the pair of struts 15b adjacent to each other. Accordingly, the pair of strut 15b is more reliably supported by the connection member 15c. In addition, the connection member 15c supports the pair of struts 15h at the position close to the outer peripheral surface 14g of the electric motor 14. Therefore, the electric motor 14 can be more reliably supported.

In addition, in the electric motor support mechanism 15 according to the present embodiment, the silencer 30 which guides the gas suctioned from outside to the intake port 11a and lowers the level of noise generated in the impeller 11 is located on the intake port 11a side of the impeller 11. The cylindrical member 15a has the first flange portion 15e attached to the end portion on the intake port 11a side of the air inlet guide 12, and the second flange portion 11f attached to the end portion on the intake port 11a side of the silencer 30.

In this way, both the end portions in the direction of the axis line X of the cylindrical member 15a are respectively supported by the air inlet guide 12 and the silencer 30. Accordingly, it is possible to reliably fix the position in the direction of the axis line X of the cylindrical member 15a.

In addition, in the electric motor support mechanism 15 according to the present embodiment, the plurality of struts 15b support the electric motor 14 so that the electric motor 14 is located at the position farther away from the intake port 11a along the direction of the axis line X than the cylindrical member 15a.

In this way, the electric motor 14 is located at the position far away from the intake port 11a to which the compressed gas flows. Therefore, it is possible to prevent the flow of the fluid flowing into the intake port 11a from being disadvantageously hindered by the electric motor 14.

REFERENCE SIGNS LIST

10: CENTRIFUGAL COMPRESSOR
11: IMPELLER (COMPRESSOR UNIT)
11a: INTAKE PORT
11e: ROTARY SHAFT
12: AIR GUIDE CASING (CASING UNIT)
14: ELECTRIC MOTOR (ELECTRIC MOTOR)
14a: ROTOR
14f: DRIVE SHAFT
14g: OUTER PERIPHERAL SURFACE
15: ELECTRIC MOTOR SUPPORT MECHANISM (ELECTRIC MOTOR SUPPORT MECHANISM)
15a: CYLINDRICAL MEMBER
15b: STRUT (SUPPORT MEMBER)
15c: CONNECTION MEMBER
15d: INNER PERIPHERAL SURFACE
15e: FIRST FLANGE PORTION
15f: SECOND FLANGE PORTION
20: TURBINE
30: SILENCER
40: ROTOR SHAFT
100: TURBOCHARGER
AR1, AR2, AR3, AR4: AREA
X: AXIS LINE

The invention claimed is:

1. An electric motor support mechanism of a compressor including a compressor unit for compressing a fluid flowing from an intake port, a casing unit for accommodating the compressor unit, and an electric motor having a housing and a drive shaft connected to a rotary shaft of the compressor unit, the mechanism comprising:
a cylindrical member that is attached to an end portion on the intake port side of the casing unit, and that is formed in a cylindrical shape around an axis line extending along the rotary shaft;
a plurality of support members that are respectively connected to a plurality of locations on an inner peripheral surface of the cylindrical member, and that extend in a radial direction from the inner peripheral surface toward the axis line; and
a connection member that connects a pair of the support members located adjacent to each other in a circumferential direction around the axis line,
wherein the plurality of support members respectively connect a plurality of locations on an inner peripheral surface of the cylindrical member to a plurality of locations on an outer peripheral surface of the housing of the electric motor so that the electric motor is supported on the axis line.

2. The electric motor support mechanism according to claim 1,
wherein the connection member is formed in a plate shape extending in the circumferential direction, one end in the circumferential direction of the connection member is connected to one of the pair of support members, and the other end in the circumferential direction of the connection member is connected to the other one of the pair of support members.

3. The electric motor support mechanism according to claim 2,
wherein the connection member is not located in a first area where an interval between the pair of support members adjacent to each other in the circumferential direction is longest, and the connection member is located in the other area where the interval of the pair of support members adjacent to each other in the circumferential is shorter than the interval of the first area.

4. The electric motor support mechanism according to claim 3,
wherein the pair of support members forming the first area is located apart from each other with an angular interval from 120° to 180° around the axis line.

5. The electric motor support mechanism according to claim 1,
wherein the connection member is formed in a plate shape extending along the circumferential direction, and
wherein the connection member is located at a position closer to the outer peripheral surface of the electric motor than the inner peripheral surface of the cylindrical member in the radial direction.

6. The electric motor support mechanism according to claim 1, further comprising:
a silencer that is located on the intake port side of the compressor, that guides the fluid suctioned from outside to the intake port side, and that lowers a level of noise generated in the compressor,
wherein the cylindrical member has a first flange portion attached to an end portion on the intake port side of the casing unit, and a second flange portion attached to an end portion on the intake port side of the silencer.

7. The electric motor support mechanism according to claim 1,
wherein the plurality of support members support the electric motor so that the electric motor is located at a position farther from the intake port along a direction of the axis line than the cylindrical member.

8. A compressor comprising:
the compressor unit;
the casing unit;
the electric motor; and
the electric motor support mechanism according to claim 1.

9. A turbocharger comprising:
the compressor according to claim 8; and
a turbine that rotates around the axis line, and that is connected to the rotor shaft of the compressor unit.

* * * * *